(12) United States Patent
Guo

(10) Patent No.: US 10,550,749 B2
(45) Date of Patent: Feb. 4, 2020

(54) EXHAUST GAS TEMPERATURE SENSOR DIAGNOSTIC SYSTEM

(71) Applicant: Nissan North America, Inc., Franklin, TN (US)

(72) Inventor: Yichao Guo, Rochester Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 390 days.

(21) Appl. No.: 15/463,058

(22) Filed: Mar. 20, 2017

(65) Prior Publication Data

US 2018/0266298 A1     Sep. 20, 2018

(51) Int. Cl.
*F01N 9/00*     (2006.01)

(52) U.S. Cl.
CPC ............. *F01N 9/005* (2013.01); *F01N 9/007* (2013.01); *F01N 2560/06* (2013.01); *F01N 2900/0422* (2013.01); *F01N 2900/1404* (2013.01)

(58) Field of Classification Search
CPC .... F01N 11/00; F01N 11/005; F01N 2560/06; F01N 2900/0422; F01N 2900/08; F01N 2900/12; F01N 2900/1404; F01N 9/005; F01N 9/007; Y02T 10/47
USPC .......................................... 60/274, 276, 277
See application file for complete search history.

(56) References Cited

U.S. PATENT DOCUMENTS

| | | | |
|---|---|---|---|
| 5,388,454 A * | 2/1995 | Kuroda | F02D 41/22 73/114.75 |
| 7,418,322 B2 | 8/2008 | Kariya et al. | |
| 7,588,368 B2 | 9/2009 | Hagen et al. | |
| 7,730,718 B2 * | 6/2010 | Higuchi | F02D 41/025 123/697 |
| 8,428,853 B2 | 4/2013 | Nakashima et al. | |
| 8,549,902 B2 * | 10/2013 | Matsunaga | F02D 41/1446 73/114.69 |
| 2013/0269662 A1 | 10/2013 | Kuhn et al. | |

FOREIGN PATENT DOCUMENTS

JP          4503498 B2     7/2010
WO     2013179701 A1     12/2013

* cited by examiner

*Primary Examiner* — Thai Ba Trieu
*Assistant Examiner* — Diem T Tran
(74) *Attorney, Agent, or Firm* — Global IP Counselors, LLP

(57) ABSTRACT

An exhaust gas temperature sensor diagnostic system includes an exhaust gas temperature sensor, a controller and a storage device. The controller is programmed to wakeup after a predetermined time after engine shutdown, determine a temperature of the sensor and ambient temperature, calculate a difference in the temperature of the sensor after wakeup to a temperature of the sensor at engine shutdown, determine an estimated temperature of the sensor based on the ambient temperature and the predetermined time, add the difference in the temperature of the sensor at wakeup to the estimated temperature to determine a compensated estimated sensor reading, determine a difference between the compensated estimated sensor reading and a corrected sensor reading, compare the difference between the compensated estimated sensor reading and a corrected sensor reading to a threshold to determine whether the sensor is operating properly. The storage device is configured to store information related to the sensor.

14 Claims, 8 Drawing Sheets

EXHAUST GAS TEMPERATURE SENSOR DIAGNOSTIC SYSTEM

BACKGROUND

Field of the Invention

The present invention generally relates to an exhaust gas temperature sensor diagnostic system. More specifically, the present invention relates to an exhaust gas temperature sensor diagnostic system capable of running diagnostic during engine startup or shutdown to detect failure of an exhaust gas temperature sensor.

Background Information

Exhaust gas temperature sensors are used to monitor the exhaust gas temperature of an internal combustion engine. By monitoring exhaust gas temperature, the vehicle computer system can estimate the real-time catalyst temperature, and the engine's air-fuel ratio. Conventional exhaust-gas temperature sensor systems can include an exhaust-gas temperature sensor disposed in an exhaust-gas passage of an internal combustion engine, an exhaust-gas temperature measurement unit which obtains an exhaust-gas temperature measurement value on the basis of an output value from the exhaust-gas temperature sensor, and a diagnosis unit which compares an exhaust-gas temperature estimation value to the exhaust-gas temperature measurement value to diagnose exhaust-gas-temperature sensor failure. The exhaust-gas temperature estimation value could come from a model that is based on the ratio of the external heat radiation amount to the exhaust gas heat amount, or other exhaust-gas temperature models.

SUMMARY

It has been also discovered that sensor rationality diagnosis utilize a model for exhaust gas temperature sensors that requires very restricted conditions to be enabled. This causes the controller to run infrequently such that the in-use monitor performance ratio is low and could be hard to meet the minimum ratio that is mandated by regulations. The low in-use monitor performance ratio makes it very hard to tighten the fail criteria range by adding more restrains to enable the diagnostic algorithm.

To increase the in-use monitor performance ratio, one aspect of the present disclosure provides an exhaust gas temperature sensor diagnostic system, comprising an exhaust gas temperature sensor, a controller and a storage device. The exhaust gas temperature sensor is configured to be disposed in an exhaust manifold of a vehicle. The controller is configured and programmed to be able to wakeup (i.e., power on by itself without user inputs after complete shutdown) after a predetermined time after engine shutdown, determine a temperature of the exhaust gas temperature sensor and ambient air temperature, calculate a difference in the temperature of the exhaust gas temperature sensor after wakeup to a temperature of the exhaust gas temperature sensor at engine shutdown, determine an estimated temperature of the exhaust gas temperature sensor based on the ambient air temperature and the predetermined time after engine shutdown, add the difference in the temperature of the exhaust gas temperature sensor at wakeup to the estimated temperature of the exhaust gas temperature sensor to determine a compensated estimated exhaust gas temperature, determine a difference between the compensated estimated exhaust gas temperature and a corrected exhaust gas temperature sensor reading, compare the difference between the compensated estimated exhaust gas temperature and a corrected exhaust gas temperature sensor reading to a threshold to determine whether the exhaust gas temperature sensor is operating properly. The storage device is configured to store information related to whether the exhaust gas temperature sensor is operating properly.

Another aspect of the present disclosure provides a method of diagnosing an exhaust gas temperature sensor. The method includes causing a controller to wakeup after a predetermined time after engine shutdown, determining, via the controller, a temperature of the exhaust gas temperature sensor and ambient air temperature, calculating, via the controller, a difference in the temperature of the exhaust gas temperature sensor after wakeup to a temperature of the exhaust gas temperature sensor at engine shutdown, determining, via the controller, an estimated temperature of the exhaust gas temperature sensor based on the ambient air temperature and the predetermined time after engine shutdown, adding, via the controller, the difference in the temperature of the exhaust gas temperature sensor at wakeup to the estimated temperature of the exhaust gas temperature sensor to determine a compensate exhaust gas temperature sensor reading, determining, via the controller the difference between the compensated estimated exhaust gas temperature and a corrected exhaust gas temperature sensor reading to a threshold to determine whether the exhaust gas temperature sensor is operating properly, and storing via a storage device, store information related to whether the exhaust gas temperature sensor is operating properly.

Another aspect of the present disclosure provides an exhaust gas temperature sensor diagnostic system. The system includes an exhaust gas temperature sensor, a controller and a storage device. The exhaust gas temperature sensor is configured to be disposed in an exhaust manifold of a vehicle. The controller is programmed to determine whether an engine has been running a predetermined time, determine a temperature of the exhaust gas temperature sensor compare the temperature of the exhaust gas temperature sensor to a theoretical temperature from a model, determine whether the exhaust gas temperature sensor is operating properly. The storage device is configured to store information related to whether the exhaust gas temperature sensor is operating properly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
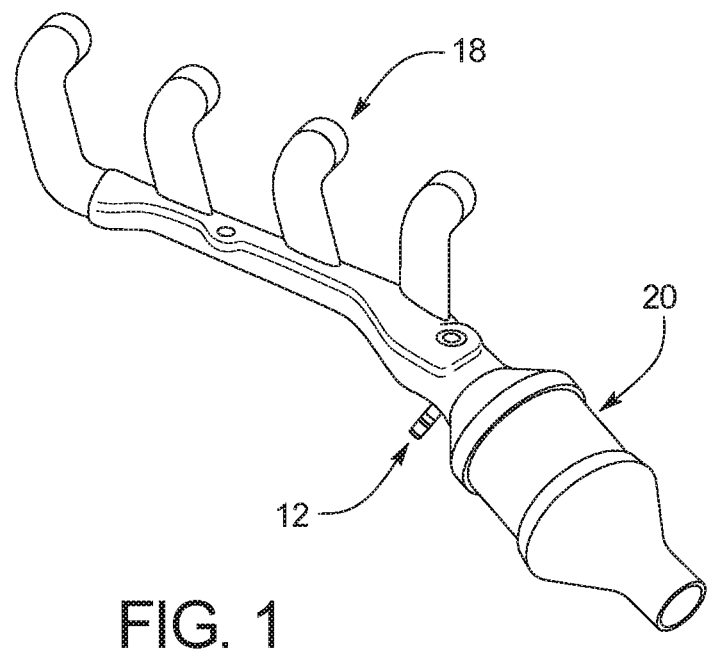
FIG. 1 is a top perspective view of an exhaust manifold that includes an exhaust gas temperature sensor according to an embodiment of the present invention.
Figure 2:
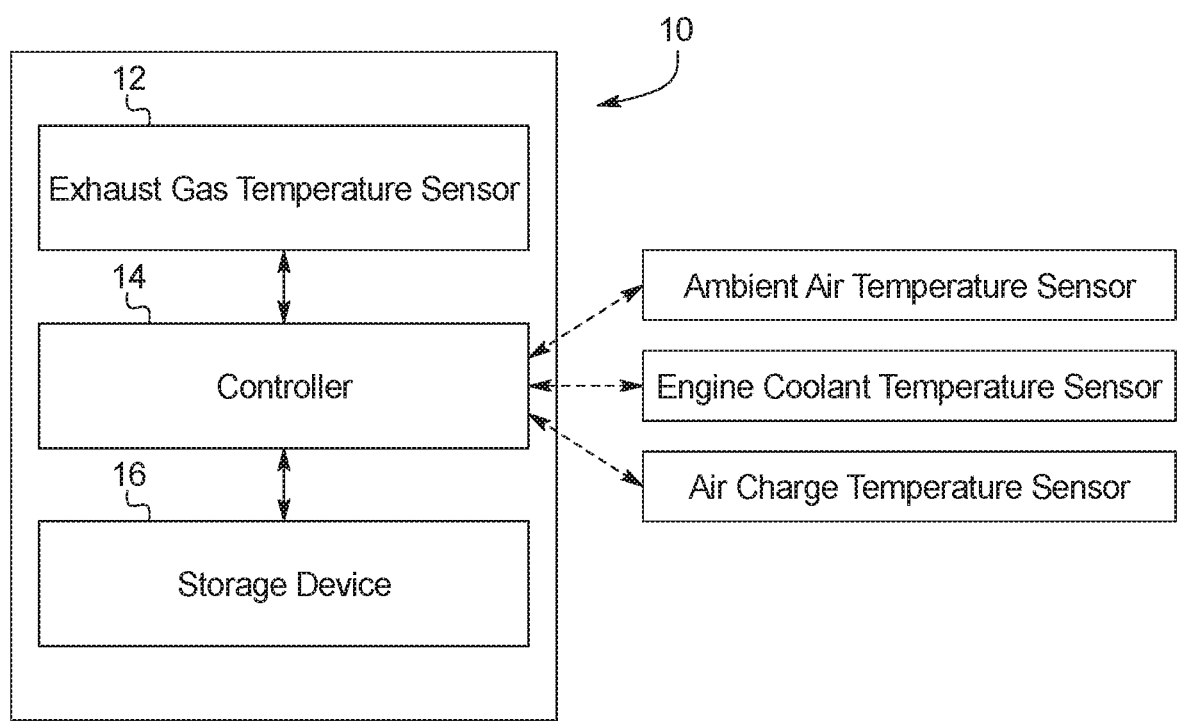
FIG. 2 is a schematic view of an exhaust gas temperature sensor diagnostic system according to an embodiment of the present invention.

Referring initially to FIGS. 1 and 2, an exhaust gas temperature sensor diagnostic system 10 is illustrated in accordance with a first embodiment. The exhaust gas temperature sensor diagnostic system 10 includes an exhaust gas temperature (EGT) sensor (or electronic control unit—ECU) 12, a controller 14 and a storage device 16.

The exhaust gas temperature sensor 12 can be disposed in the exhaust manifold 18 or between the exhaust manifold 18 and the catalyst 20 (or catalytic converter) or in any other suitable position along the exhaust system. In one embodiment, the exhaust gas temperature sensor 12 is located at one end of the exhaust manifold 18, immediately before the catalyst 20. The exhaust gas temperature sensor 12 can be used for fuel enrichment control to reduce CO emission in high speed/load condition while protecting catalyst thermal deterioration. As one of ordinary skill would understand, by determining or sensing the temperature of the exhaust gas, the vehicle is capable of determining CO emission and thus controlling fuel enrichment to reduce the CO emission.

The exhaust gas temperature sensor 12 can be a full-range sensor capable of sensing a temperature range that covers an entire range that the exhaust temperature could experience. For example, the full-range exhaust gas temperature sensor 12 can be capable of sensing a temperature from about −50 Degrees C. to about 1050 Degrees C. However, the exhaust gas temperature sensor 12 can be a partial-range sensor capable of sensing a temperature range that covers only part of the range that the exhaust temperature could experience. Partial-range sensors generally only cover a range that occurs when the exhaust path is heated up. For example, the partial-range exhaust gas temperature sensor 12 can be capable of sensing a temperature from about 70 Degrees C. to about 1050 Degrees C.

As one of ordinary skill would understand, the exhaust manifold 18 collects the exhaust gases from multiple cylinders into one pipe. Exhaust manifolds are generally cast iron or stainless steel units which collect engine exhaust gas from multiple cylinders and deliver it to the exhaust pipe.

The catalyst 20 (or catalytic converter) is an emissions control device that converts toxic gases and pollutants in exhaust gas to less toxic pollutants by catalyzing a redox reaction (an oxidation and a reduction reaction).

The controller 14 can be an electronic control module or unit or any other suitable control device that is capable of carrying out the algorithms and decisions discussed herein. The controller 14 preferably includes a microcomputer with a control program that controls the exhaust gas temperature sensor diagnostic system 10 as discussed below. The controller 14 can also include other conventional components such as an input interface circuit, an output interface circuit, and storage devices such as a ROM (Read Only Memory) device and a RAM (Random Access Memory) device. The microcomputer of the controller 14 is programmed to control the exhaust gas temperature sensor diagnostic system 10. The memory circuit stores processing results and control programs such as ones for the exhaust gas temperature sensor diagnostic system 10 operation that are run by the processor circuit. The controller 14 is operatively coupled to the exhaust gas temperature sensor 12 and additional sensors in the vehicle in a conventional manner. The internal RAM of the controller 14 stores statuses of operational flags and various control data. The controller 14 is capable of selectively controlling any of the components of the exhaust gas temperature sensor diagnostic system 10 in accordance with the control program. It will be apparent to those skilled in the art from this disclosure that the precise structure and algorithms for the controller 14 can be any combination of hardware and software that will carry out the functions of the present invention.

In one embodiment, the exhaust gas temperature sensor diagnostic system 10 is configured to perform a diagnostic of the exhaust gas temperature sensor 12. As one of ordinary skill would understand, when the engine is off, there is no combustion in the cylinder and no airflow in the exhaust path. The thermal conditions are stable and predictable, and the noise factors that could potentially impact the exhaust gas temperature sensor 12 reading are minimized.

Traditionally, conventional exhaust gas temperature sensors perform mutual comparisons among temperature sensors at key-on after a long soak time (i.e., the time in which the engine is off). Such strategy, however, has several drawbacks. First, this process only applies to full-range temperature sensors, since a long soak time will cause all the temperature sensors to read close to or at the ambient temperature. Accordingly, partial-range temperature sensors with a low-end cutoff temperature being well above normal ambient temperature range (e.g., 70 Deg. C.) cannot be compared with other temperature sensors. Second, these types of algorithms require a long soak time, which has a negative impact on the in-use monitor performance ratio. Third, even if the exhaust gas temperature sensor 12 is a full-range sensor, such detection only ensures that the exhaust gas temperature sensor 12 has not drifted around the ambient temperature range.

As is understood, the exhaust manifold 20 will reach stable thermal states after the engine runs a predetermined time, or engine is off for a while. These are the two states that diagnostic algorithm could utilizes.

Figure 3:
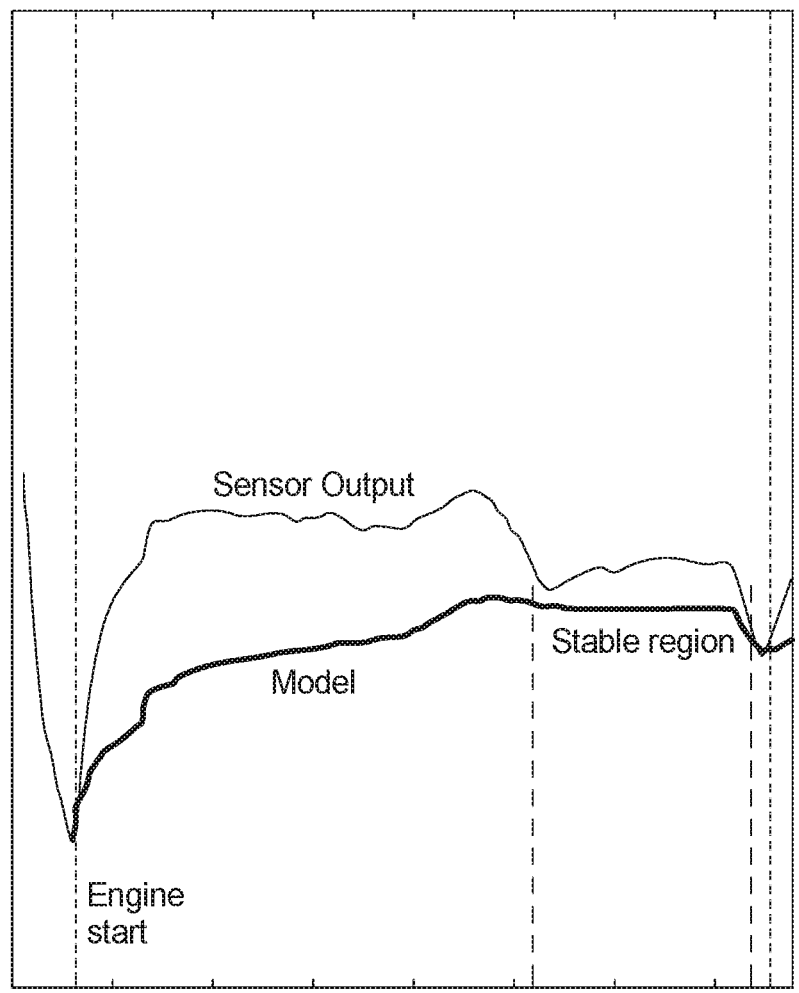
FIG. 3 is a graph comparing the exhaust gas temperature sensor output with a model output.

FIG. 3 is a graph comparing the exhaust gas temperature sensor 12 output with the model sensor output. As shown in this graph, after the exhaust manifold 18 reaches stable thermal state a predetermined amount of time after the engine starts. Within the predetermined time range (i.e., the stable region), a two-sided rationality (diagnostic) with improved In-Use Monitor Performance Ratio (IUMPR) can be performed.

Figure 4:
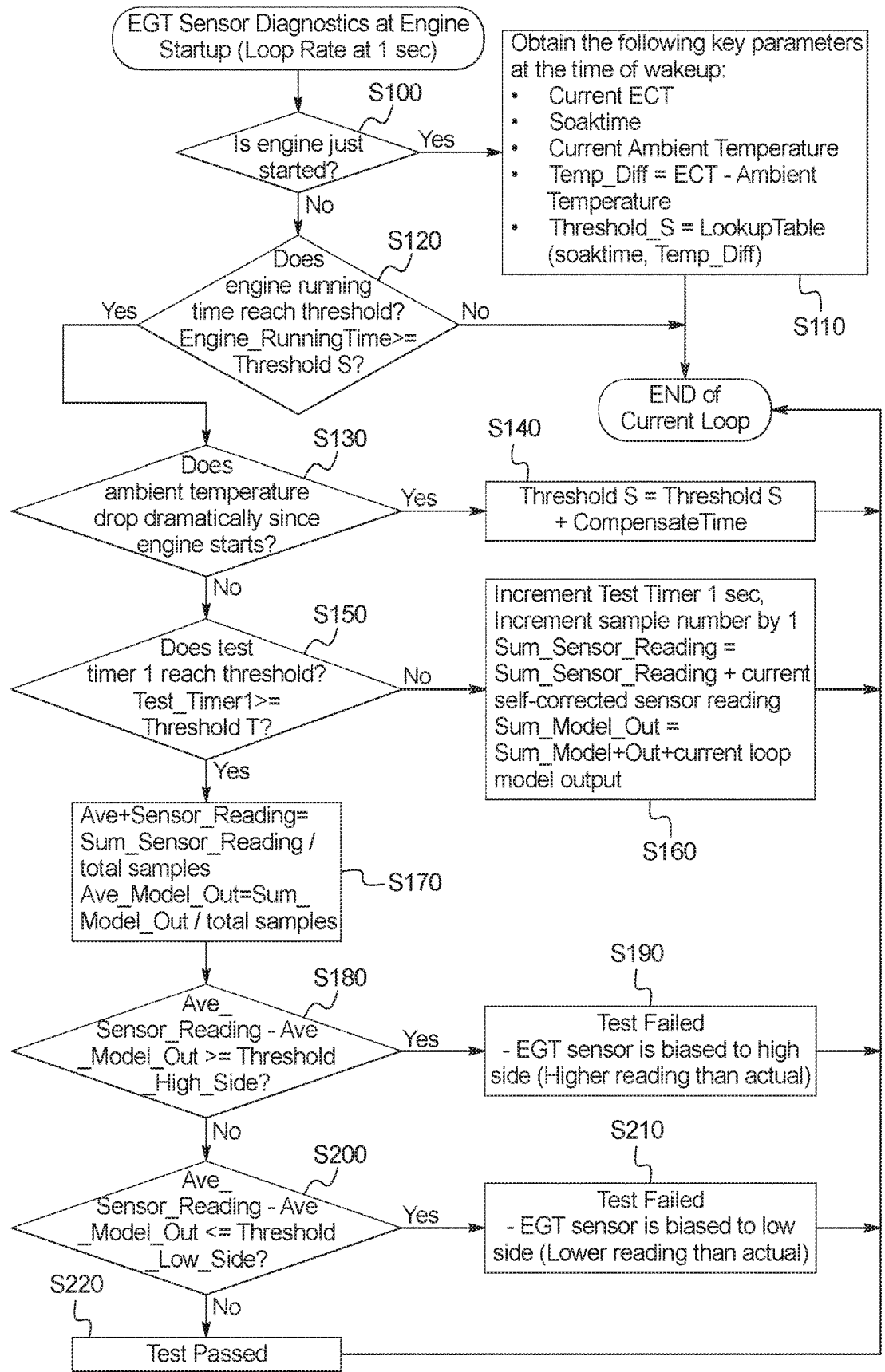
FIG. 4 is a flow chart illustrating an exhaust gas temperature sensor diagnostic at engine start up.

FIG. 4 is a flow chart illustrating such a two-sided diagnostic at engine start up (having a one second loop rate) for the exhaust gas temperature sensor 12. In step S100, the controller 14 is programmed to determine whether the engine has recently started. That is, has controller 14 just woken up due to engine start up. If the engine has recently started, the controller 14 is programmed, in step S110, to obtain or determine at least one of the following parameters: current engine coolant temperature (ECT), the engine soak time prior to startup, the current ambient air temperature, the temperature difference (temp_diff) between the engine coolant temperature (ECT) and the ambient air temperature and a predetermined threshold (threshold S) from a look up table (Table 1).

TABLE 1

| Temp_diff \|soaktime | Soaktime >= 30 mins | 30 mins < soaktime <= 5 mins | soaktime < 5 mins |
|---|---|---|---|
| <=5 Degrees C. | 600 seconds | 360 seconds | 120 seconds |
| 5 Degrees C. < Temp_diff <= 70 Degrees C. | 360 seconds | 240 seconds | 120 seconds |
| 70 Degrees C. | 120 seconds | 120 seconds | 60 seconds |

If the engine has not recently started, the controller 14 is programmed to determine whether the engine runtime (engine_runningtime) is greater than or equal to the predetermined threshold (threshold S). That is, has the engine of the vehicle been running for a predetermined amount of time in step S120. If the engine runtime is not greater than or equal to the predetermined threshold (threshold S), the current loop ends. If the engine runtime is greater than or equal to the predetermined threshold (threshold S), the controller 14 is programmed to determine whether the ambient air temperature has dropped a predetermined amount since engine start up in step S130. If the ambient air temperature has dropped a predetermined amount since engine start up, the controller 14 is programmed to determine that the predetermined threshold (threshold S) is the predetermined threshold (threshold S) plus a compensate time in step S140. The predetermined threshold (threshold S) plus a compensate time is set as the new predetermined threshold (threshold S) and stored in the storage device 16.

If the ambient air temperature has not dropped a predetermined amount since engine start up, the controller 14 is programmed to determine whether the time in a test timer (test_timer1) has reached a predetermined threshold (threshold T, e.g., 1 second) in step S150. If the time in the test timer (test_timer1) has not reached the predetermined threshold (threshold T), the controller 14 is programmed to increment the test timer by 1 second and increment a sample number by one in step S160. The controller 14 is also programmed to determine a sum sensor reading (sum_sensor) by adding the current sum sensor reading (sum_sensor) with the current self-corrected sensor reading and to determine the sum model out (sum_model_out) by adding the current sum model out (sum_model_out) to the current loop model output.

If the time has reached a predetermined threshold, the controller 14 is programmed to average the sensor readings (ave_sensor_reading) by dividing the sum of the sensor readings (sum_sensor_reading) by the total number of sensor samples, and average the model out sum by dividing the sum of the model out by the total number of samples in step S170.

Thus, in this embodiment, a timer-controlled test window is enabled after a calibratable engine running period. The calibratable engine running time is determined by looking up in table 1 the startup engine coolant temperature and soak time. After the calibratable running time, a test timer begins to increment. The timer will stop once it reaches threshold S. While the timer incrementing, the self-corrected exhaust gas temperature sensor readings are averaged, and the associated exhaust gas temperature model output is also averaged.

The controller 14 is then programmed to subtract the average model out (ave_model_out) from the average sensor reading (ave_sensor_reading) and determine whether the solution is greater than or equal to a threshold high side (threshold_high_side) in step S180. If the solution is greater than or equal to a threshold high side, the controller 14 is programmed to determine that the sensor has failed the diagnostic test and is biased to the high side (the sensor reading is higher than the actual temperature) in step S190. If the solution is less than the threshold high side(threshold_high_side), the controller 14 is programmed to determine if the solution is less than or equal to a threshold low side (threshold_low_side) in step S200.

If the solution is less than or equal to a threshold low side, the controller 14 is programmed to determine that the sensor has failed the diagnostic test and is biased to the low side (the sensor reading is lower than the actual temperature) in step S210. If the solution is less than the threshold low side, the controller 14 is programmed to determine that the sensor has passed the diagnostic test in step S220.

The controller 14 is programmed to store the test results (both pass and fail) in a storage device 16. Moreover, is desired, the test results can be displayed on any suitable display device.

Turing to the embodiment in which the diagnostic can be run after engine shutdown. For a hot exhaust manifold, its temperature will decay, and such decay closely follows a pattern that when the ambient conditions are known (e.g., ambient temperature, vehicle speed for plug-in hybrid electric vehicle (PHEV)). For different configurations of powertrain, the engine off Exhaust Gas Temperature algorithm could be run in different scenarios: For example, in vehicles having engines that can be completely turned off while driving (e.g., PHEV), this diagnostic algorithm will run as long as the engine is off, and controller 14 and exhaust gas sensor 12 are powered on when the prescribed soak time reaches the predetermined threshold. In this embodiment, the vehicle can driven by alternative power sources (e.g., a battery). For other vehicles with the engine as the only power source, the controller 14 and selected sensors (e.g., including exhaust gas temperature sensor 12) have the capability to be woken up after the vehicle is shut down, when the engine soak time reaches predetermined thresholds.

Figure 5:
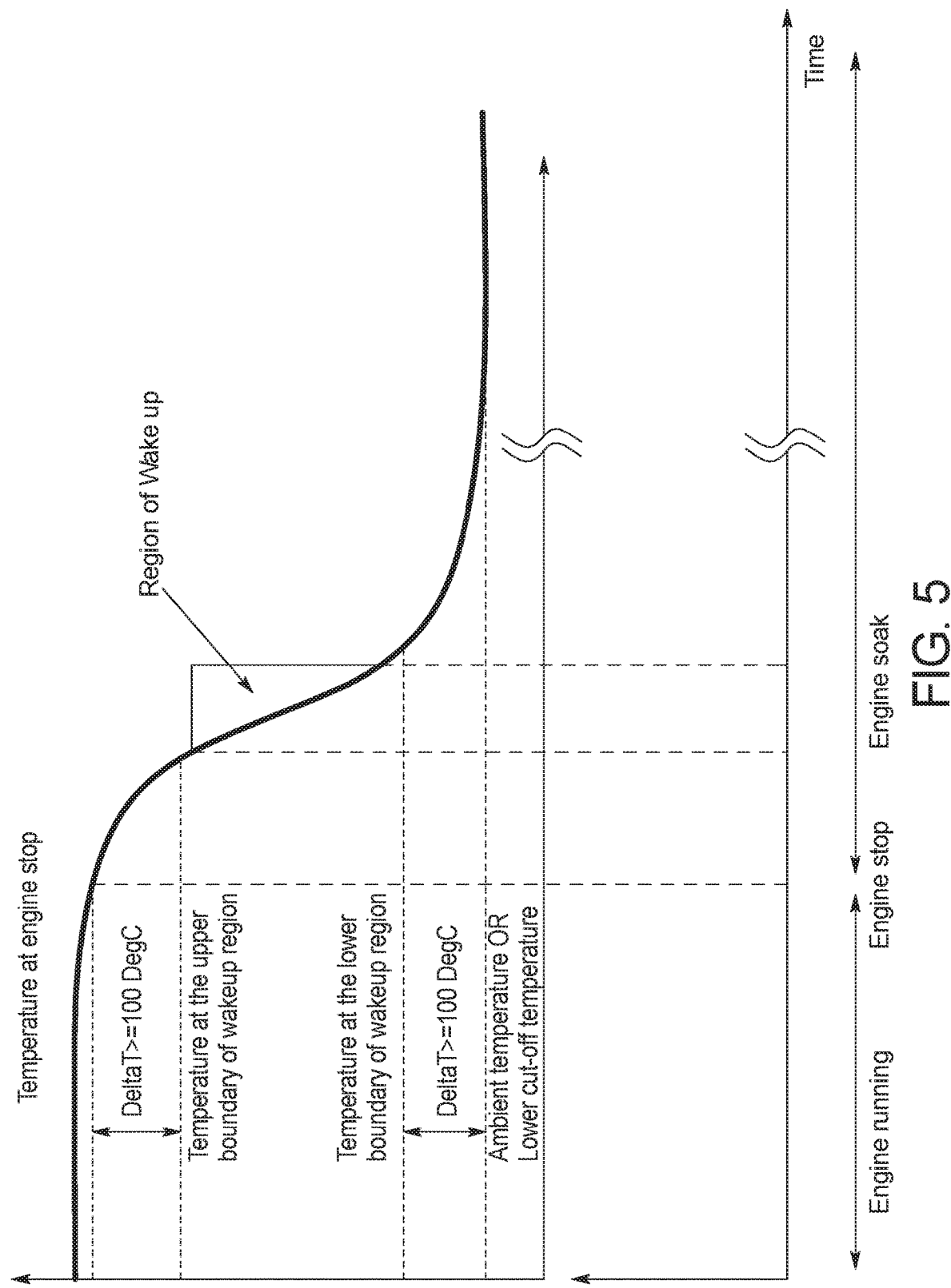
FIG. 5 is a graph comparing engine temperature to engine soak time.

FIG. 5 illustrates a graph of the engine run time and engine soak time relative to the exhaust gas temperature for the diagnostic process with the engine off. The graph also illustrates a region of engine wakeup for diagnostics during an engine shut down period. In the embodiment, the wakeup region begins a predetermined amount of time after engine shut down. Based on modeled data, the controller 14 can predict a predetermined temperature after engine shut down (i.e., predetermined soak time). For example, modeled data can enable the controller 14 to wakeup when the exhaust gas temperature sensor 12 has dropped about 100 degrees C. from engine shut down. The wakeup region is able to monitor and record data for a predetermined amount of time during the region of wakeup. In this embodiment, the region of wake up can terminate at about 100 degrees C. above the ambient air temperature.

In the diagnostic process used during engine off, the model output is the output of a lookup table (based on soak time and ambient temperature) that is compensated by ambient temperature changes during engine shutdown. The lookup table is calibrated as follow: Soak the vehicle in a stable ambient temperature (e.g., 20 Degrees C.); Run the engine for over 10 minutes and coolant temperature is above 90 degrees C.; Key off, and measure exhaust gas temperature readings every time interval (e.g., 1 minute), until exhaust gas temperature reading drops to about the ambient air temperature. The designed wakeup interval can be an integer multiplier, and the exhaust gas temperature reading difference between the two wakeups that are next to each other should be 100 degrees C. and above for good separation. Repeat the process for at least 3 times for averaging at each measurement points. The baseline of exhaust gas temperature reading drop is then completed for 20 Degrees C. Repeat every 5 degrees C., starting −10 degrees C. In embodiments that perform the diagnostic after engine off, the wakeup point can be chosen in the region that the exhaust gas temperature reading is at least 100 degrees C. above ambient temperature (for a full range sensor) or 100 degrees C. above the cut off temperature (for a partial range sensor) AND 200 degrees C. below the averaged exhaust gas temperature reading at shutdown after meeting the running condition above, as shown in FIG. 5.

Figure 6:
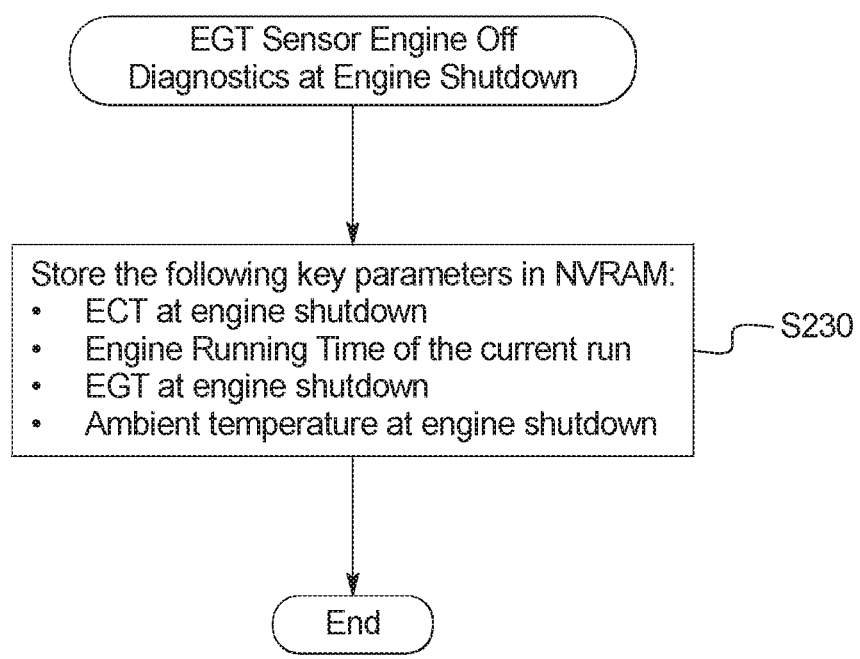
FIG. 6 is a flow chart illustrating an exhaust gas temperature sensor diagnostics at engine shut down.

FIG. 6 illustrates a flow chart of the exhaust gas temperature sensor 12 engine off diagnostic at engine shut down. Once the engine is off, the wakeup module (in the controller 14 or any other suitable component) will wake up the controller 14 and selected sensors at least once the soak time reaches the prescribed threshold(s). The algorithm is designed to wakeup multiple times to fit the needs of performing multiple comparison during engine off. As shown in step S230, the controller 14 is programmed to store the following parameters in the storage device 16 at engine shut down: the engine coolant temperature (ECT), the engine run time, during the current run, the exhaust gas temperature at engine shut down and the ambient air temperature at engine shut down.

Each time the engine is woken up, the self-corrected exhaust gas sensor temperature reading is then filtered (a first order filter with 0.1 or smaller filter coefficient for example) and compared with a filtered model output with the same filter settings after a calibratable period of time (e.g., 15 seconds) after wakeup.

Figure 7:
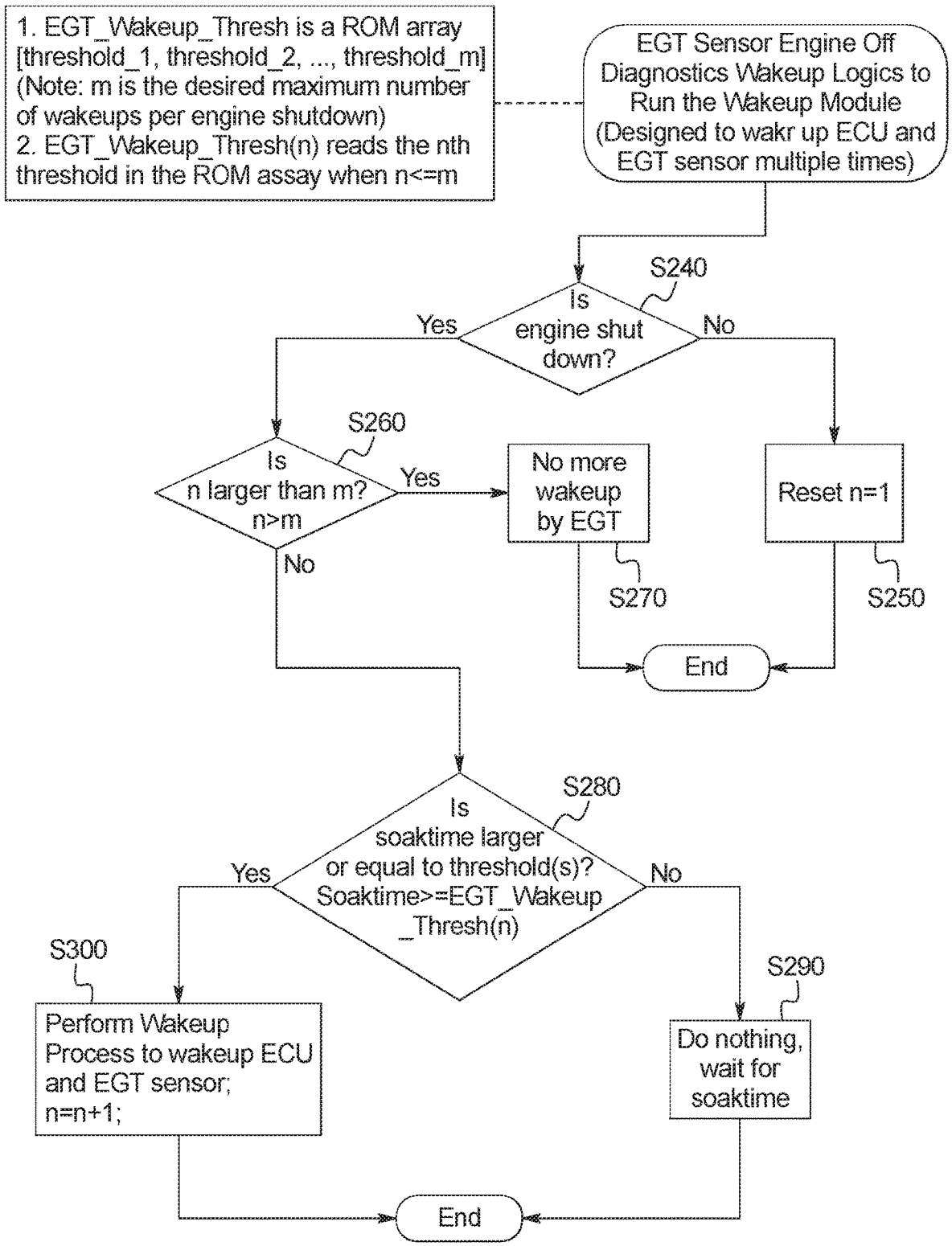
FIG. 7 is a flow chart illustrating an exhaust gas temperature sensor engine off Diagnostics.

FIG. 7 illustrates a flow chart for the exhaust gas temperature sensor 12 engine off diagnostic wake up logistics. As illustrated in FIG. 7, the controller 14 reads a wakeup threshold variable n (EGT_wakeup_threshold(n)) (threshold 1, threshold 2, threshold 3, . . . threshold m) in a wakeup threshold array. The threshold array has a sequential number of wake ups that have occurred during engine shutdown, with the maximum number of wakeups being m. In step S240, the controller 14 determines whether the engine is shut down or not. If the engine is not shut down, the controller 14 is programmed to reset the wakeup threshold variable n to 1 in step S250. If the controller 14 determines that the engine is shut down, the controller 14 is programmed to determine the current number of wake ups during the current engine shutdown (wakeup threshold variable n), and whether the wakeup threshold variable n is greater than m in step S260. If the wakeup threshold variable n is greater than m, the controller 14 is programmed to terminate wake ups for the exhaust gas temperature sensor 12 diagnostic in step S270.

If the wakeup threshold variable n is less than or equal to m, the controller 14 is programmed to determine whether the engine soak time is greater than or equal the wakeup threshold variable n in step S280. If the engine soak time is not greater than or equal to the wakeup threshold variable n, the controller 14 is programmed to do nothing and wait for the soak time to increase in step S290. If the engine soak time is greater than or equal to the wakeup threshold variable n, the controller 14 is programmed to perform the wakeup process and wake up the exhaust gas temperature sensor diagnostic system 10 in step S300. The controller 14 is further programmed to set the wakeup threshold variable n to n+1.

Figure 8A:
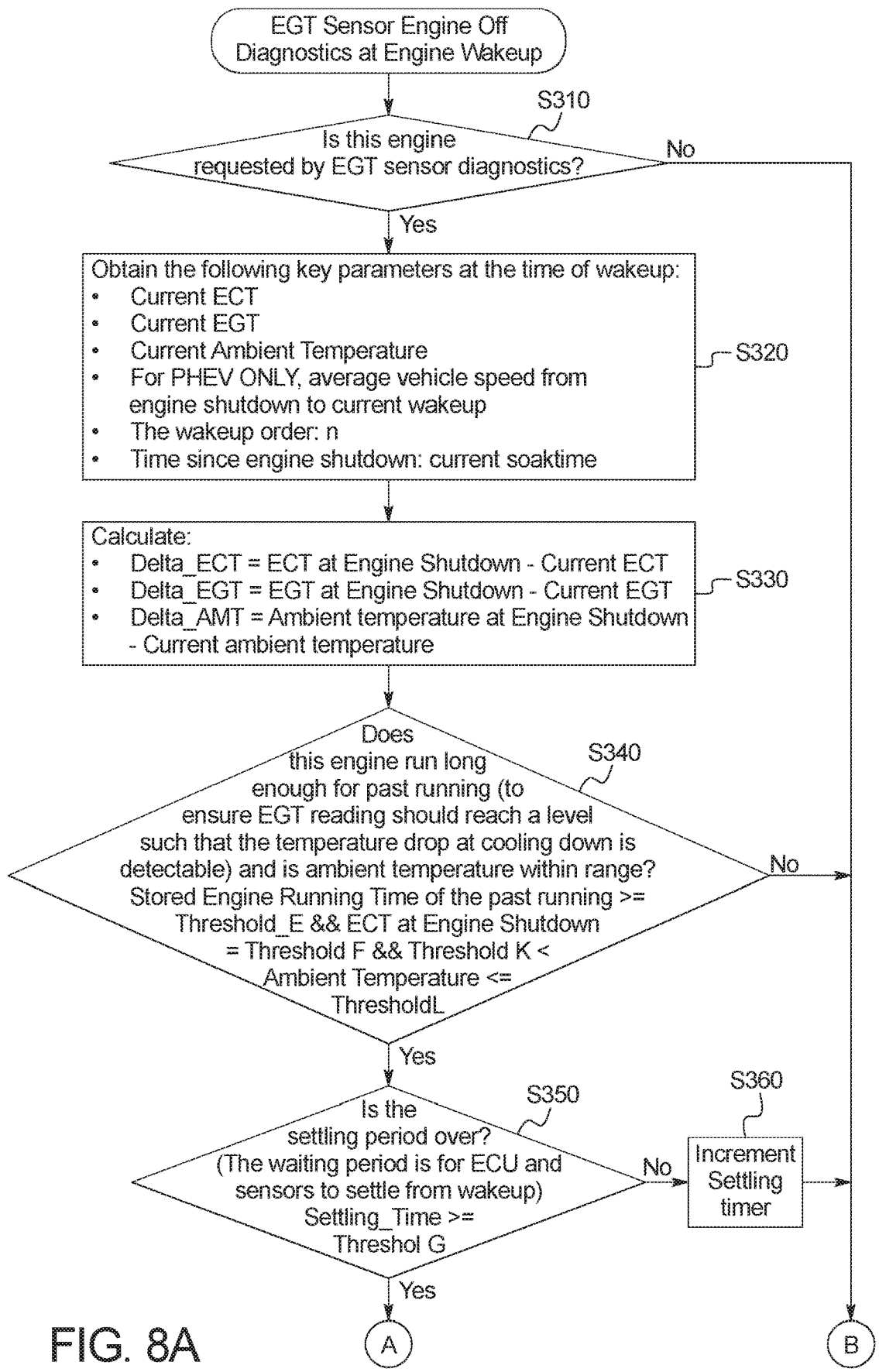
FIGS. 8A and 8B are a flow chart illustrating an exhaust gas temperature sensor engine off Diagnostics at engine wakeup.
Figure 8B:
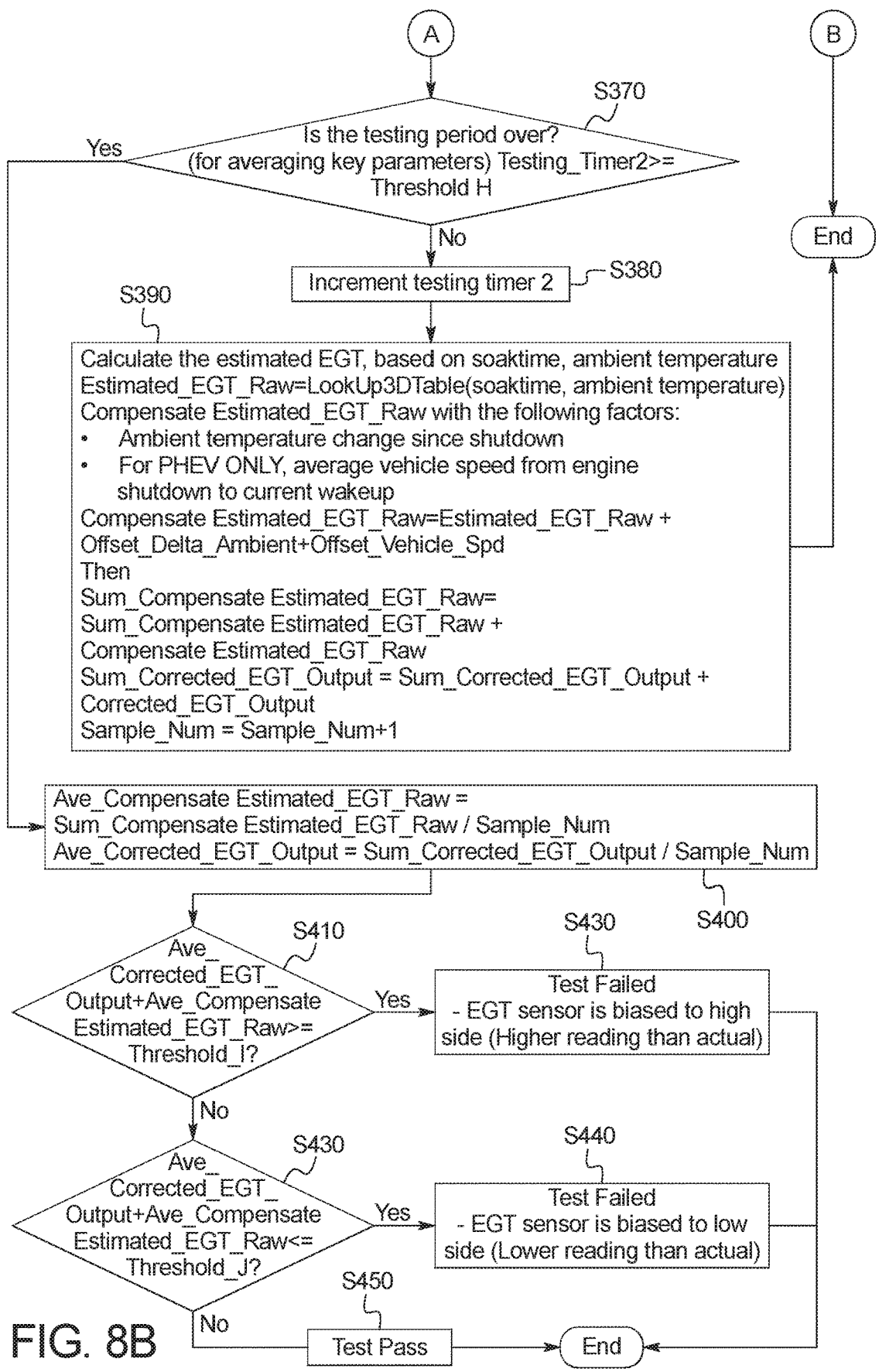

FIGS. 8A and 8B illustrate a flow chart for the exhaust gas sensor engine off diagnostic at engine wakeup. In step S310, the controller 14 determines whether the wake up is requested by the exhaust gas temperature sensor diagnostic system 10. If the wake up is not requested by the exhaust gas temperature sensor diagnostic system 10, the process ends. If the wake up is requested by the exhaust gas temperature sensor diagnostic system 10, the controller 14 is programmed to, in step S320, obtain or determine at least one of the following parameters: the current engine coolant temperature, the current exhaust gas temperature, the current ambient air temperature, the average vehicle speed from engine shut down to the current wake up, the wakeup order n, and the time since engine shutdown (current soak time). The controller 14 is then programmed to calculate the difference between the current engine coolant temperature and the engine coolant temperature at engine shutdown (delta_ECT), the difference between current exhaust gas temperature and the exhaust gas temperature at engine shutdown (delta_EGT) and difference betweeb the current ambient air temperature and the ambient air temperature at engine shutdown (delta_AMT) in step S330.

In step S340 the controller 14 is programmed to determine whether the engine runtime has been long enough to ensure that the exhaust gas temperature sensor reading has reached a level such that the temperature drop during cool down is detectable, and determine whether the ambient air temperature is within a predetermined range. That is, whether the stored engine runtime is greater than or equal to a predetermined threshold (threshold E). Additionally, the controller 14 is programmed to determine whether the engine coolant temperature at engine shutdown is equal to a predetermined threshold (threshold F), and whether the ambient air temperature is greater than a predetermined threshold (threshold K) and less than or equal to a predetermined threshold (threshold L).

If the controller 14 determines that each of the conditions in step S340 are not met the diagnostic process ends. However, if the controller 14 determines that all of the conditions in step S340 are met, the controller 14 is programmed to determine whether the settling period is over in step S350. That is, the waiting period for the controller 14 and sensors to settle from wakeup. In one embodiment, the controller 14 can determine whether the time on a settling timer (setting_period) is greater than or equal to a predetermined threshold (threshold G). If the controller 14 determines that the settling timer is not greater than or equal to the predetermined threshold (threshold G), the controller 14 is programmed to increment the settling timer in step S360.

If the controller 14 determines that the settling timer is greater than or equal to the predetermined threshold (threshold G), the controller 14 is programmed to determine whether the testing period is over (testing_time2 greater than or equal to threshold H) in step S370. If the controller 14 determines that the testing period is not over, the controller 14 is programmed to increment the testing timer in step S380. The controller 14 is then programmed to calculate the estimated exhaust gas temperature, based on soak time and ambient air temperature in step S390. That is, the controller 14 is programmed to estimate the exhaust gas temperature sensor raw temperature by using a table 1 that estimates the exhaust gas temperature sensor raw temperature (estimated_EGT_raw) using the soak time and the ambient air temperature. The controller 14 is then programmed to calculate a compensated estimated exhaust gas temperature sensor raw temperature (compensated_estimated_EGT_raw) by determine the ambient air temperature change (offset_delta_ambient) since engine shutdown and the average vehicle speed from engine shutdown to current wakeup for hybrid vehicles. That is, the controller 14 determines the compensated estimated exhaust gas raw temperature (compensated_estimated_EGT_raw) by adding the estimated exhaust gas raw temperature (estimated_EGT_raw) to the change in ambient air temperature (offset_delta_ambient) and the average vehicle speed (offset_vehicle_spd). The controller 14 then determines the sum compensated estimated exhaust gas raw temperature by adding the sum estimated exhaust gas raw temperature (sum_compensated_estimated_EGT_raw) to the compensated estimated exhaust gas raw temperature (compensated_estimated_EGT_raw) and determining the sum corrected exhaust gas temperature output (sum_corrected_EGT_output) by adding the sum corrected exhaust gas output (sum_corrected_EGT output) to the corrected exhaust gas output (corrected_EGT_output). Moreover, the sample number is incremented by one by the controller 14.

Turning back to step S370, if the controller 14 determines that the testing period is over, the controller 14 is programmed to determine the average compensated estimated raw temperature (sum_compensated_estimated_EGT raw) by dividing the sum compensated estimated exhaust gas raw temperature (sum_compensated_estimated_EGT_raw) by the sample number in step S400. In step S410, the controller 14 is programmed to determine whether the average corrected exhaust gas temperature output (ave_corrected_EGT_output) minus the average compensated estimated raw temperature (ave_compensated_estimated_EGT_raw) is greater than or equal to a predetermined threshold (threshold I). If the average corrected exhaust gas temperature output (ave_corrected_EGT_output) minus the average compensated estimated raw temperature (ave_compensated_estimated_EGT_raw) is greater than or equal to a than the predetermined threshold (threshold I), the controller 14 determines that the test has failed and that the exhaust gas temperature sensor is biased to the high side (higher reading that the actual exhaust gas temperature in step S420. This is result is stored in the storage device 16, and displayed on a display device, if desired.

If the average corrected exhaust gas temperature output (ave_corrected_EGT_output) minus the average compensated estimated raw temperature (ave_compensated_estimated_EGT_raw) is not greater than or equal to a than the predetermined threshold (threshold I), the controller 14 determines whether the average corrected exhaust gas temperature output (ave_corrected_EGT_output) minus the average compensated estimated raw temperature (ave_compensated_estimated_EGT_raw) is less than or equal to a than a predetermined threshold (threshold J) in step S430. If the average corrected exhaust gas temperature output (ave_corrected_EGT_output) minus the average compensated estimated raw temperature (ave_compensated_estimated_EGT_raw) is less than or equal to the predetermined threshold (threshold J), the controller 14 determines that the test has failed and that the exhaust gas temperature sensor is biased to the low side (lower reading that the actual exhaust gas temperature) in step S440. This is result is stored in the storage device 16, and displayed on a display device, if desired.

If the average corrected exhaust gas temperature output (ave_corrected_EGT_output) minus the average compensated estimatedcompensated estimated raw temperature (ave_compensate_estimated_EGT_raw) is not less than or equal to a predetermined threshold (threshold J), the controller 14 determines that the sensor 12 has passed in step S450. This is result is stored in the storage device 16, and displayed on a display device, if desired.

Embodiments of the present invention are capable of performing accurate non-stuck and two-sided exhaust gas temperature sensor rationality check when the engine starts, and two-side exhaust gas temperature sensor rationality check when the engine shuts down. The exhaust gas temperature sensor diagnostic algorithms at engine start and shut down are capable of working together or independently. Embodiments of the present invention are further advantageous since they can depend on the stable thermal state in the exhaust manifold to perform exhaust gas temperature sensor after engine start, and can rely on the natural cooling effect of the exhaust manifold to detect failures. Flexible wakeup functions allow wakeup multiple times for comparisons. Moreover, the engine-off algorithm is suitable for various powertrain configurations.

Further, the embodiments described herein capture a steady thermal state after engine starts for comparison, eliminating the need for a complicated exhaust gas temperature model to work in different transient conditions, has simple entry conditions, which maximizes in-use monitor performance ratio, and is capable of performing diagnostic under simplified and stable thermal conditions, lowering engineering cost and eliminating the noise factors from all transient conditions.

The exhaust gas temperature sensor 12, the catalyst 20 and the manifold 18 are conventional components that are well known in the art. Since exhaust gas sensor 12, the catalyst 20 and the manifold 18 are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a vehicle equipped with the exhaust gas temperature sensor diagnostic system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "about" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An exhaust gas temperature sensor diagnostic system, comprising:
   an exhaust gas temperature sensor configured to be disposed in an exhaust manifold of a vehicle;
   a controller programmed to:
   determine a temperature of the exhaust gas temperature sensor and an ambient air temperature after a predetermined time after an engine shutdown;
   calculate a difference between the temperature of the exhaust gas temperature sensor after the predetermined time after the engine shutdown and a temperature of the exhaust gas temperature sensor at the engine shutdown;
   determine an estimated temperature of the exhaust gas temperature sensor based on the ambient air temperature and the predetermined time after the engine shutdown;
   add the difference in the temperature of the exhaust gas temperature sensor at the predetermined time after the engine shutdown to the estimated temperature of the exhaust gas temperature sensor to determine a compensated estimated exhaust gas temperature;
   determine a difference between the compensated estimated exhaust gas temperature and a corrected exhaust gas temperature sensor reading, compare the difference between the compensated estimated exhaust gas temperature and a corrected exhaust gas temperature sensor reading to a threshold to determine whether the exhaust gas temperature sensor is operating properly; and
   a storage device configured to store information related to whether the exhaust gas temperature sensor is operating properly.

2. The system according to claim 1, wherein the controller is configured to determine a temperature of engine coolant at the predetermined time after the engine shutdown and a temperature of the engine coolant at the engine shutdown, and compare the difference between the temperature of engine coolant at the predetermined time after the engine shutdown and the temperature of the engine coolant at the engine shutdown to determine whether the difference between the temperature of engine coolant at the predetermined time after the engine shutdown and the temperature of the engine coolant at the engine shutdown is greater than or equal to another threshold.

3. The system according to claim 1, wherein the controller is configured to determine whether the ambient air temperature is between a first ambient air temperature threshold and a second ambient air temperature threshold.

4. The system according to claim 1, wherein the compensated estimated exhaust gas temperature is one of a plurality of temperatures of the compensated estimated exhaust gas and the controller is programmed to determine the average of the plurality of temperatures of the compensated estimated exhaust gas.

5. The system according to claim 1, wherein the controller is programmed to determine an average of engine speed of the last driving cycle at a new start.

6. The system according to claim 1, wherein the controller is programmed to determine whether the difference between the compensated estimated exhaust gas temperature and the corrected exhaust gas temperature sensor reading is greater than the threshold to determine whether the exhaust gas temperature sensor is operating properly.

7. The system according to claim 6, wherein the controller is programmed to determine whether the difference between the compensated estimated exhaust gas temperature and the corrected exhaust gas temperature sensor reading is less than another threshold to determine whether the exhaust gas temperature sensor is operating properly.

8. A method of diagnosing an exhaust gas temperature sensor, comprising:
   determining, via a controller, a temperature of the exhaust gas temperature sensor and an ambient air temperature after a predetermined time after an engine shutdown;
   calculating, via the controller, a difference in the temperature of the exhaust gas temperature sensor after the predetermined time after the engine shutdown to a temperature of the exhaust gas temperature sensor at the engine shutdown;
   determining, via the controller, an estimated temperature of the exhaust gas temperature sensor based on the ambient air temperature and the predetermined time after engine shutdown;
   adding, via the controller, the difference in the temperature of the exhaust gas temperature sensor at the predetermined time after the engine shutdown to the estimated temperature of the exhaust gas temperature sensor to determine a compensated estimated exhaust gas temperature;
   determining, via the controller, a difference between the compensated estimated exhaust gas temperature and a corrected exhaust gas temperature sensor reading;
   comparing, via the controller the difference between the compensated estimated exhaust gas temperature and a corrected exhaust gas temperature sensor reading to a threshold to determine whether the exhaust gas temperature sensor is operating properly; and storing via a storage device, store information related to whether the exhaust gas temperature sensor is operating properly.

9. The method according to claim 8, further comprising determining, via the controller, a temperature of engine coolant at the predetermined time after the engine shutdown; and a temperature of the engine coolant at the engine shutdown, and comparing the difference between the temperature of engine coolant at the predetermined time after the engine shutdown and the temperature of the engine coolant at the engine shutdown to determine whether the difference between the temperature of engine coolant at the predetermined time after the engine shutdown and the temperature of the engine coolant at the engine shutdown is greater than or equal to another threshold.

10. The method according to claim 8, further comprising determining, via the controller, whether the ambient air temperature is between a first ambient air temperature threshold and a second ambient air temperature threshold.

11. The method according to claim 8, wherein the compensated estimated exhaust gas temperature sensor reading is one of a plurality of compensated estimated exhaust gas temperature outputs, and determining, via the controller, the average of the plurality of compensated estimated exhaust gas temperatures.

12. The method according to claim 8, further comprising determining, via the controller, an average of engine speed of the latest driving cycle for a new start.

13. The method according to claim 8, further comprising determining, via the controller, whether the difference between the compensated estimated exhaust gas temperature and the corrected exhaust gas temperature sensor reading is greater than the threshold to determine whether the exhaust gas temperature sensor is operating properly.

14. The method according to claim 8, further comprising determining, via the controller, whether the difference between the compensated estimated exhaust gas temperature and the corrected exhaust gas temperature sensor reading is less than another threshold to determine whether the exhaust gas temperature sensor is operating properly.

* * * * *